United States Patent
Carrier et al.

(10) Patent No.: US 12,403,653 B2
(45) Date of Patent: Sep. 2, 2025

(54) EXTRUDER HEAD ASSEMBLY FOR ADDITIVE MANUFACTURING MACHINES

(71) Applicant: DYZE DESIGN, Lemoyne (CA)

(72) Inventors: Philippe Carrier, Montreal (CA); Maxence Gelinas-Guy, Boucherville (CA); Thomas Jasmin, Montreal (CA)

(73) Assignee: DYZE DESIGN, Lemoyne (CA)

( * ) Notice: Subject to any disclaimer, the term of this patent is extended or adjusted under 35 U.S.C. 154(b) by 231 days.

(21) Appl. No.: 18/304,489

(22) Filed: Apr. 21, 2023

(65) Prior Publication Data

US 2024/0351278 A1  Oct. 24, 2024

(51) Int. Cl.
    *B29C 64/209* (2017.01)
    *B29C 64/118* (2017.01)
    *B33Y 30/00* (2015.01)

(52) U.S. Cl.
    CPC ............ *B29C 64/209* (2017.08); *B33Y 30/00* (2014.12); *B29C 64/118* (2017.08)

(58) Field of Classification Search
    CPC ... B29C 64/209; B29C 64/118; B29C 64/106; B29C 64/295; B33Y 30/00; B33Y 10/00
    See application file for complete search history.

(56) References Cited

U.S. PATENT DOCUMENTS

| | | | |
|---|---|---|---|
| 5,094,603 A | 3/1992 | Gellert | |
| 9,821,502 B2 | 11/2017 | Lind et al. | |
| 10,016,929 B2 | 7/2018 | Wang et al. | |
| 2015/0096717 A1 | 4/2015 | Batchelder et al. | |
| 2017/0157826 A1 | 6/2017 | Hishiki | |
| 2018/0117832 A1 | 5/2018 | Haider et al. | |
| 2020/0346398 A1 | 11/2020 | Guillemette et al. | |
| 2020/0406522 A1 | 12/2020 | Lu et al. | |
| 2021/0323231 A1* | 10/2021 | Padgett | B33Y 40/10 |

(Continued)

FOREIGN PATENT DOCUMENTS

| | | |
|---|---|---|
| CA | 1313005 C | 1/1993 |
| CN | 207825470 U | 9/2018 |
| CN | 112440466 A | 3/2021 |

(Continued)

OTHER PUBLICATIONS

European Search Report issued in co-pending European patent application No. 23169338.3 on Sep. 22, 2023.

(Continued)

*Primary Examiner* — Nahida Sultana
(74) *Attorney, Agent, or Firm* — BCF LLP

(57) ABSTRACT

An extruder head assembly, which is for an additive manufacturing machine, includes a melt zone component, and a nozzle operatively connected to the melt zone component. The melt zone component is operatively connected to a cold end component for receiving and heating filament. The melt zone component includes a heat source, and an interior member in thermal communication with the heat source. The interior member defines therein a passage, at least one melt channel, and at least one aperture fluidly connecting the passage to the at least one melt channel. The passage and the at least one melt channel are fluidly connected downstream from the at least one aperture, the nozzle being configured to receive heated filament material from the passage and the at least one melt channel.

17 Claims, 10 Drawing Sheets

(56) References Cited

U.S. PATENT DOCUMENTS

2022/0288848 A1    9/2022   Macneish et al.
2023/0271382 A1*   8/2023   Taylor .................... B33Y 10/00
                                                                                   425/113

FOREIGN PATENT DOCUMENTS

| DE | 102020117248 A1 | 12/2021 |
|----|-----------------|---------|
| EP | 2905118 A1 | 8/2015 |
| GB | 2606780 A | 11/2022 |
| WO | 2016102669 A1 | 6/2016 |
| WO | 2016193933 A1 | 12/2016 |
| WO | 2018086792 A1 | 5/2018 |
| WO | 2019010586 A1 | 1/2019 |

OTHER PUBLICATIONS

International Search Report and Written Opinion issued in co-pending International application No. PCT/CA2023/050543 on Dec. 20, 2023.

* cited by examiner

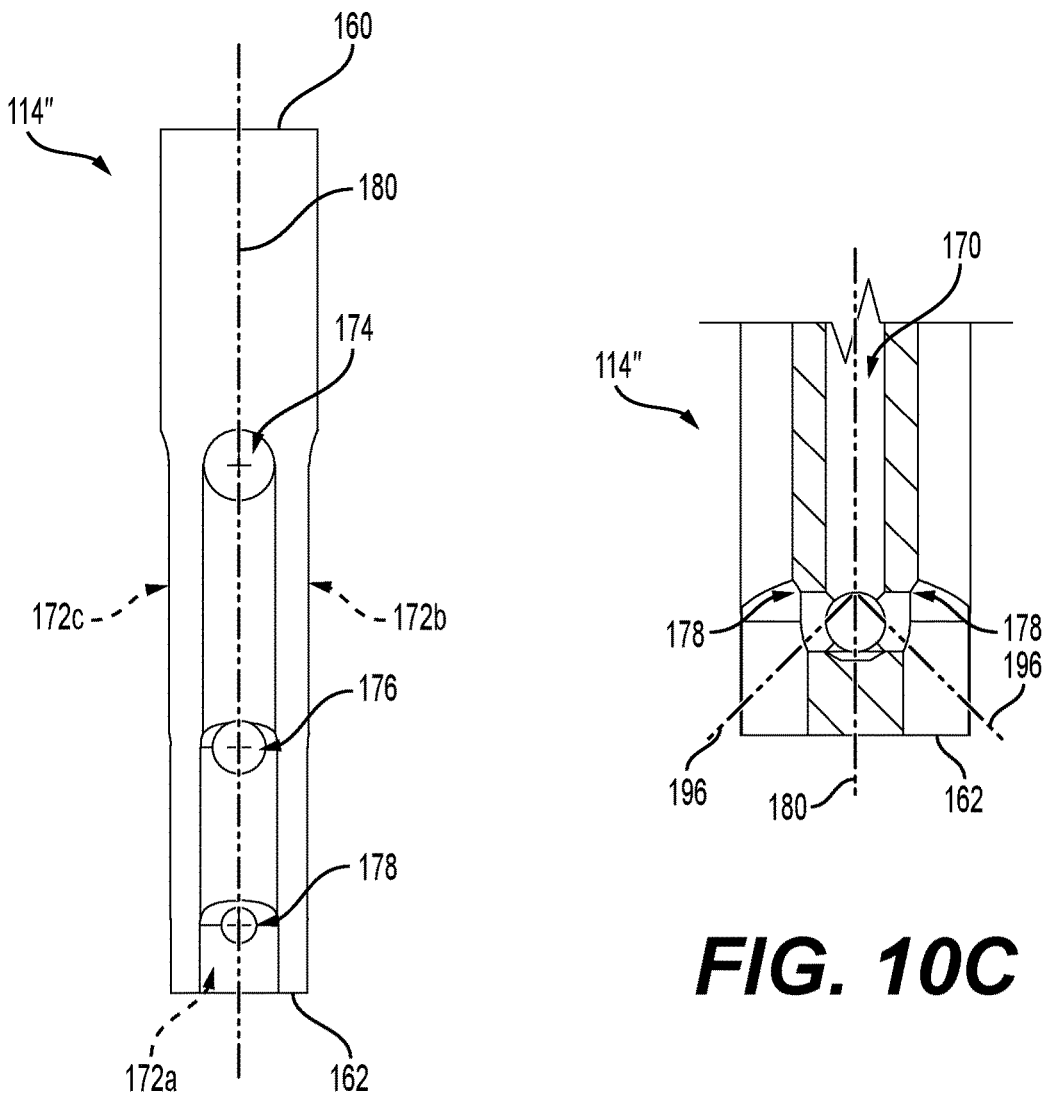
FIG. 10C
FIG. 10A
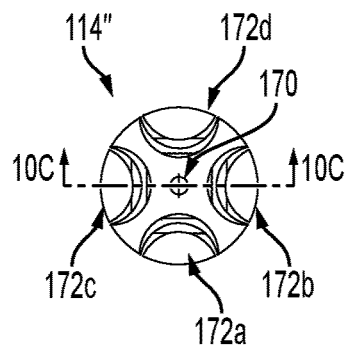
FIG. 10B

EXTRUDER HEAD ASSEMBLY FOR ADDITIVE MANUFACTURING MACHINES

TECHNICAL FIELD

The present technology relates to extruder head assemblies for additive manufacturing machines.

BACKGROUND

Additive manufacturing machines, also referred to as 3D printers, have extruder head assemblies for outputting fabrication material. Fabrication material, for example in the form of a filament, is received in the extruder head assembly, and is heated until melted. The melted material is then extruded from the extruder head assembly to manufacture an item.

Conventional extruder head assemblies do present some inconveniences. The filament can heat up unevenly, with some sections of the filament reaching a desired temperature and/or melting before other sections. For instance, a core of the filament can be at a lower temperature than a radially outer portion of the filament. This can negatively impact extrusion thereof.

Therefore, there is a desire for a technology that can overcome at least some of the above-described drawbacks.

SUMMARY

It is an object of the present technology to ameliorate at least some of the inconveniences present in the prior art.

According to one aspect of the present technology, there is provided an extruder head assembly for an additive manufacturing machine. The extruder head assembly includes a melt zone component and a nozzle. The melt zone component is operatively connected to a cold end component for receiving and heating a filament advanced by the cold end component. The nozzle is operatively connected to the melt zone component, and is configured to receive the filament having been heated from the melt zone component. The melt zone component includes a heat source and an interior member. The interior member, which is in thermal communication with the heat source, defines therein a passage, at least one melt channel, and at least one aperture fluidly connecting the passage to the at least one melt channel. The passage and the at least one melt channel are fluidly connected downstream from the at least one aperture, the nozzle being configured to receive heated filament material from the passage and the at least one melt channel.

In some embodiments, the at least one aperture defines a central aperture axis that is generally perpendicular to a plane containing the at least one aperture, the passage defines a central passage axis extending along a length passage, and the central aperture axis is generally perpendicular to the central passage axis.

In some embodiments, the at least one aperture defines a central aperture axis that is generally perpendicular to a plane containing the at least one aperture, the passage defines a central passage axis extending along a length of the passage, and the central aperture axis is skewed relative to the central passage axis.

In some embodiments, the at least one melt channel defines a central melt axis extending along the length of the at least one melt channel; and the central melt axis is parallel to the central passage axis.

In some embodiments, the passage defines a central passage axis extending along a length of the passage; the at least one melt channel defines a melt channel axis extending along a length of the at least one melt channel; and the melt channel axis is parallel to the central passage axis.

In some embodiments, the passage has a first passage diameter upstream from the at least one aperture; a second passage diameter downstream from the at least one aperture; and the first passage diameter is greater than the second passage diameter.

In some embodiments, the at least one aperture includes a first aperture and a second aperture, the second aperture being spaced from the first aperture along a length of the interior member.

In some embodiments, the first aperture has a first aperture diameter, the second aperture has a second aperture diameter, and the first aperture diameter is greater than the second aperture diameter.

In some embodiments, the passage has a first passage diameter upstream from the first aperture; a second passage diameter downstream from the first aperture and upstream from the second aperture; and a third passage diameter downstream from the second aperture. The first passage diameter is greater than the second passage diameter and the third passage diameter, and the second passage diameter is greater than the third passage diameter.

In some embodiments, the at least one melt channel includes a first melt channel and a second melt channel.

In some embodiments, the at least one aperture fluidly connects the passage to the first and second melt channels.

In some embodiments, the at least one aperture includes a first aperture fluidly connecting the passage to the first melt channel, and a second aperture fluidly connecting the passage to the second melt channel.

In some embodiments, the at least one melt channel includes a first melt channel, a second melt channel and a third melt channel. The at least one aperture includes a first aperture fluidly connecting the passage to the first melt channel, a second aperture fluidly connecting the passage to the second melt channel, and a third aperture fluidly connecting the passage to the third melt channel.

In some embodiments, the at least one aperture further includes a fourth aperture fluidly connecting the passage to the first melt channel, the fourth aperture being spaced from the first aperture along a length of the interior member.

In some embodiments, the first aperture has a first aperture diameter, the fourth aperture has a second aperture diameter, and the first aperture diameter is greater than the second aperture diameter.

In some embodiments, a first passage diameter upstream from the first aperture; a second passage diameter downstream from the first aperture and upstream from the fourth aperture; and a third passage diameter downstream from the fourth aperture. The first passage diameter is greater than the second passage diameter and the third passage diameter, and the second passage diameter is greater than the third passage diameter.

In some embodiments, the at least one aperture is configured to direct melted filament material toward the at least one melt channel, and the passage is configured to heat unmelted material of the filament.

In some embodiments, the interior member has a generally cylindrical form.

In some embodiments, the melt zone component further includes a holding member selectively receiving the interior member therein, one end of the holding member being selectively connected to the cold end component, and another end of the holding member being selectively connected to the nozzle.

In some embodiments, the extruder head assembly includes a thermal block, and the one end of the holding member is selectively connected to the cold end component by the thermal block.

In some embodiments, the heat source includes a heat transfer member, and the holding member is disposed in the heat transfer member.

In some embodiments, the heat source is a serpentine heater surrounds the holding member.

In some embodiments, the extruder head assembly further includes the cold end component for receiving the filament, the cold end component including filament advancing members.

According to another aspect of the present technology, there is provided an additive manufacturing machine including a frame; a printer bed supported by the frame; the extruder head assembly according to the above aspect or according to the above aspect and one or more of the above embodiments; and a controller supported by the frame, and operatively connected to the extruder head assembly.

According to another aspect of the present technology, there is provided an internal member for an extruder head assembly for an additive manufacturing machine. The internal member defines a passage, at least one melt channel, and at least one aperture fluidly connecting the passage to the at least one melt channel. The passage and the at least one melt channel connecting to form a nozzle passage configured to fluidly connect to a nozzle.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

It must be noted that, as used in this specification and the appended claims, the singular form "a", "an" and "the" include plural referents unless the context clearly dictates otherwise.

As used herein, the term "about" in the context of a given value or range refers to a value or range that is within 20%, preferably within 10%, and more preferably within 5% of the given value or range.

As used herein, the term "and/or" is to be taken as specific disclosure of each of the two specified features or components with or without the other. For example "A and/or B" is to be taken as specific disclosure of each of (i) A, (ii) B and (iii) A and B, just as if each is set out individually herein.

For purposes of the present application, terms related to spatial orientation when referring to an additive manufacturing machine and components in relation to the additive manufacturing machine, such as "vertical", "horizontal", "forwardly", "rearwardly", "left", "right", "above" and "below", are as they would be understood by a person standing in front of the additive manufacturing machine.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 10A is a side elevation view of the interior member of FIG. 9;

FIG. 10B is a bottom plan view of the interior member of FIG. 9; and

FIG. 10C is a cross-sectional view of part of the interior member of FIG. 9, taken along line 10C-10C of FIG. 10B.

Figure 1:
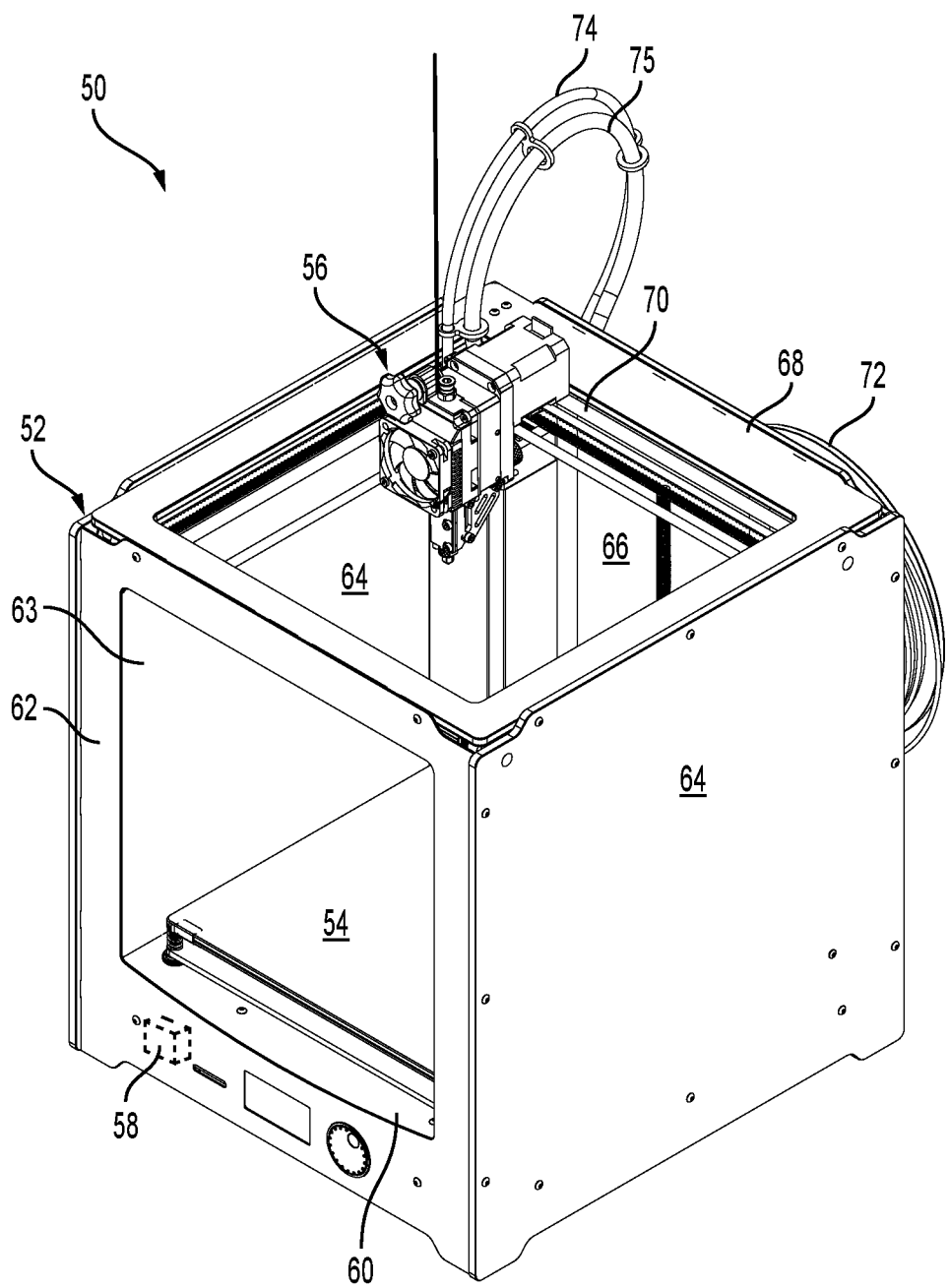
FIG. 1 is a perspective view taken from a top, front, left side of an additive manufacturing machine having an extruder head assembly according to an embodiment of the present technology.

Unless otherwise noted, the Figures may not be drawn to scale.

DETAILED DESCRIPTION

The present disclosure is not limited in its application to the details of construction and the arrangement of components set forth in the following description or illustrated in the drawings. The disclosure is capable of other embodiments and of being practiced or of being carried out in various ways. Also, the phraseology and terminology used herein is for the purpose of description and should not be regarded as limiting. The use of "including", "comprising", or "having", "containing", "involving" and variations thereof herein, is meant to encompass the items listed thereafter as well as, optionally, additional items. In the following description, the same numerical references refer to similar elements.

The present technology relates to extruder head assemblies for additive manufacturing machines. An extruder head assembly according to the present technology is configured to improve uniformity in temperature and material state in additive manufacturing material at the extrusion point of the extruder head assembly.

Referring to FIG. 1, an additive manufacturing machine 50 is shown according to one non-limiting embodiment of the present technology. More specifically, the additive manufacturing machine 50 is a three-dimensional printer (3D printer) 50. The 3D printer 50 includes a frame 52, a printer bed 54 supported by the frame 52, an extruder head assembly 56 operatively connected to the frame 52, and a controller 58 (schematically shown in FIG. 1) supported by the frame 52 and operatively connected to the extruder head assembly 56.

The frame 52 has a base 60, a front wall 62, side walls 64, a rear wall 66, and a top wall 68. The base 60 and the front, side, rear and top walls 60, 62, 64, 66 and 68 define an enclosed printing space. The front wall 62 has a window 63 which allows to look at the enclosed printing space. It is contemplated that in some embodiments, the window 63 could be omitted, and the front wall 62 could simply define an aperture. The top wall 68 defines an aperture 69, which enables, as will be described below, the extruder head assembly 56 to move relative to the frame 52. It is also contemplated that in some embodiments, the front, side, rear and top walls 60, 62, 64, 66 and 68 could be omitted, and the frame 52 could have columns disposed at each corner thereof. The frame 52 also includes a moveable member 70, which generally extends between the side walls 64. The moveable member 70 is moveable between the front and rear walls 60, 66 by actuators (not shown) which are communicatively connected to the controller 58. It is contemplated that in some embodiments, the frame 52 could include additional moveable members.

The printer bed 54, as mentioned above, is supported by the frame 52. More specifically, the printer bed 54 is moveably connected to the rear wall 66. In some embodiments, the printer bed 54 could be moveably connected to the base 60. Indeed, the printer bed 54, which has a flat upper surface, is moveable in the vertical direction by actuators (not shown) that are communicatively connected to the controller 58. It is contemplated that in some embodiments, the printer bed 54 could be generally fixed relative to the frame 52. For instance, the printer bed 54 could be connected to the base 60 such that the printer bed 54 would only be vertically moveable to adjust a horizontal level thereof (e.g., raising or lowering a corner of the printer bed 54). In such instances, the extruder head assembly 56 would be moveable in the vertical direction.

The 3D printer 50 includes a filament spool 72 (only partially shown in FIG. 1) that is connected to an external surface of the rear wall 66. It is contemplated that the filament spool 72 could be connected elsewhere on the 3D printer 50. The filament spool 72 holds the filament that is configured to be fed to the extruder head assembly 56.

The 3D printer further includes a filament tube 74 for guiding the filament from the filament spool 72 to the extruder head assembly 56. Thus, one end of the filament tube 74 receives the filament from the filament spool 72, and the other end of the filament tube 74 is connected to the extruder head assembly 56. Another tube 75 is disposed adjacent to the filament tube 74, and contains, inter alia, electrical wiring for powering the extruder head assembly 56.

The extruder head assembly 56 is configured to receive filament from the filament spool 72, to melt the filament, and to extrude melted filament material to manufacture an object.

The controller 58, which is communicatively or operatively connected to a number of components of the 3D printer 450, is configured to control various elements of the 3D printer 50, including for example operation of the extruder head assembly 56.

Figure 2:
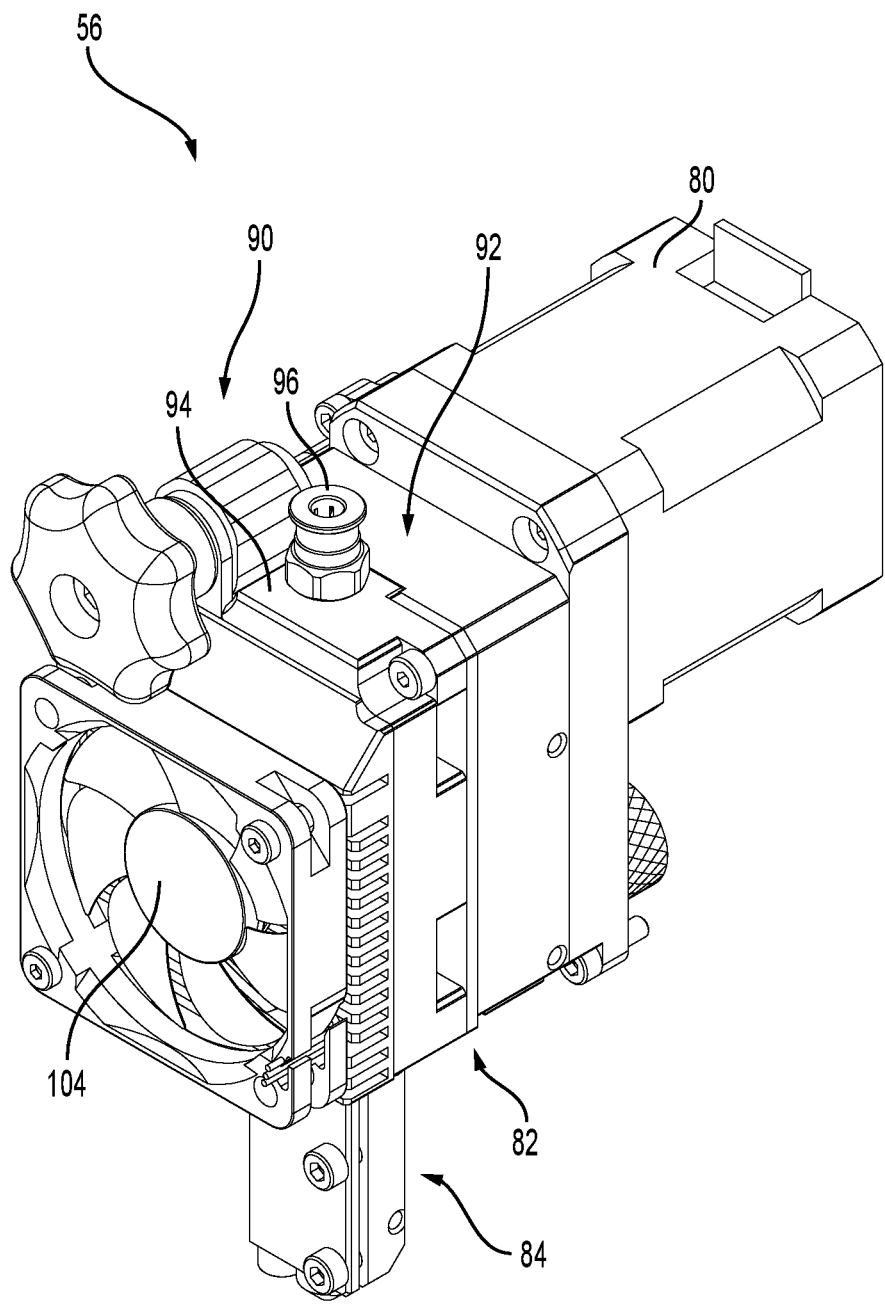
FIG. 2 is a perspective view taken from a top, front, left side of the extruder head assembly of FIG. 1.
Figure 3:
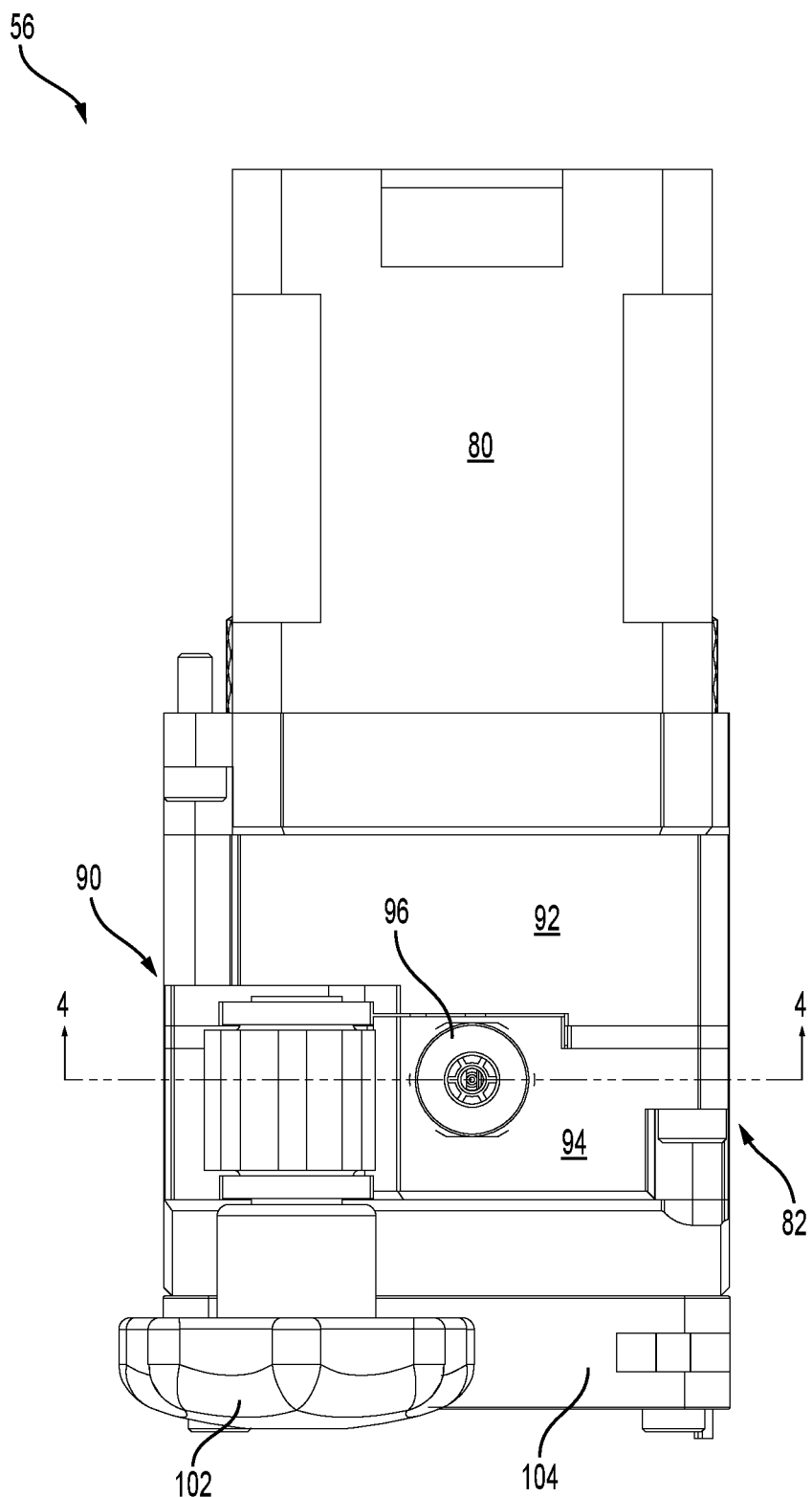
FIG. 3 is a top plan view of the extruder head assembly of FIG. 1.
Figure 4:
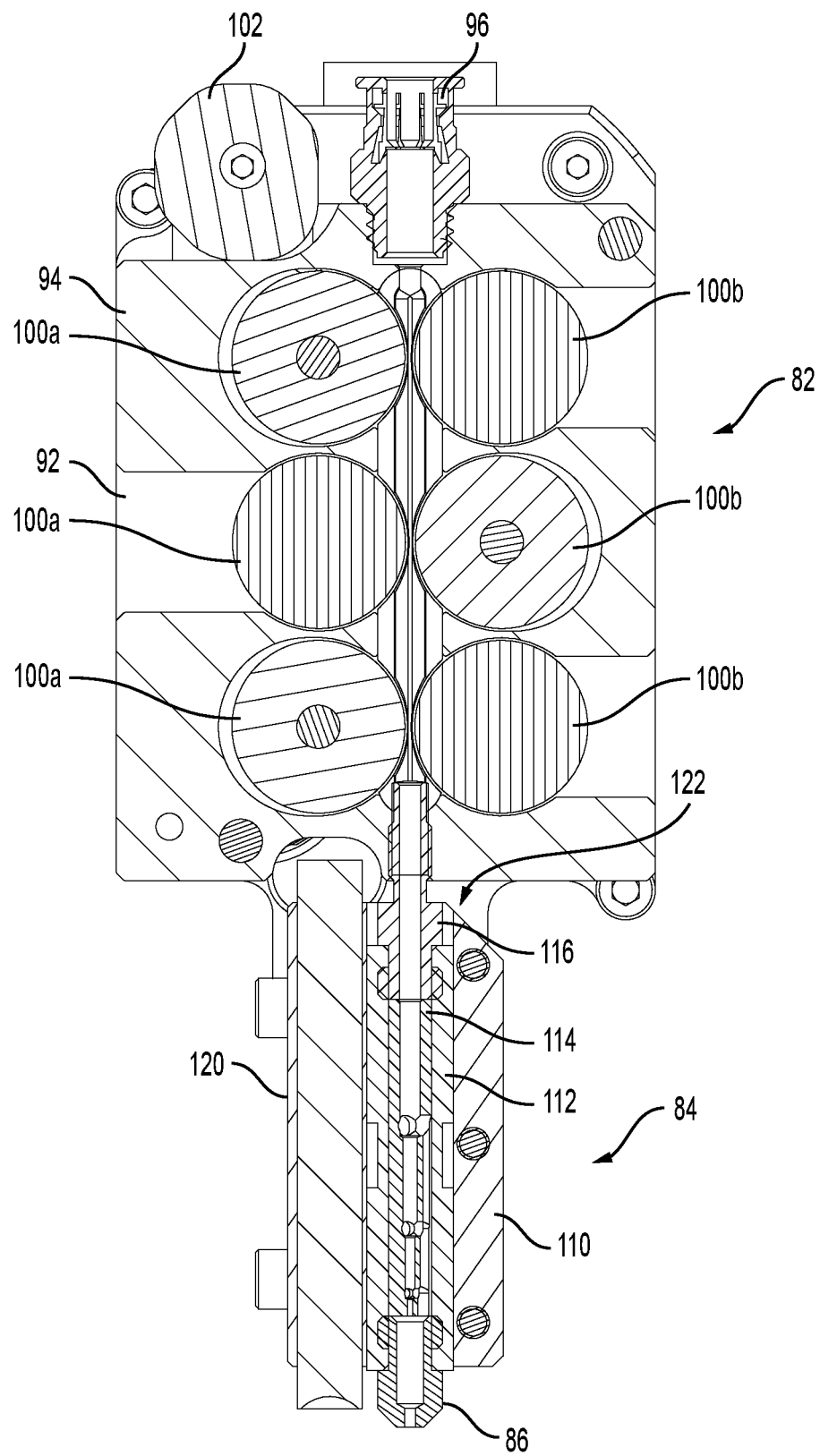
FIG. 4 is a cross-sectional view of the extruder head assembly of FIG. 1, taken along line 4-4 of FIG. 3.
Figure 5A:
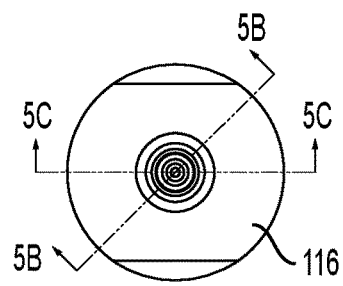
FIG. 5A is a top plan view of a melt zone component and nozzle of the extruder head assembly of FIG. 1.
Figure 5B:
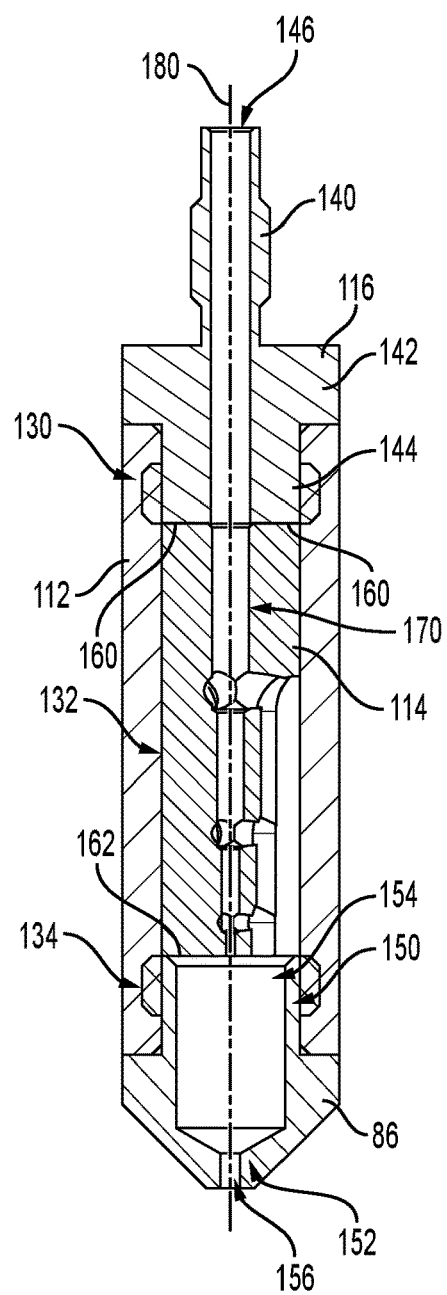
FIG. 5B is a cross-sectional view of the melt zone component and nozzle of FIG. 5A, taken along the line 5B-5B of FIG. 5A.
Figure 5C:
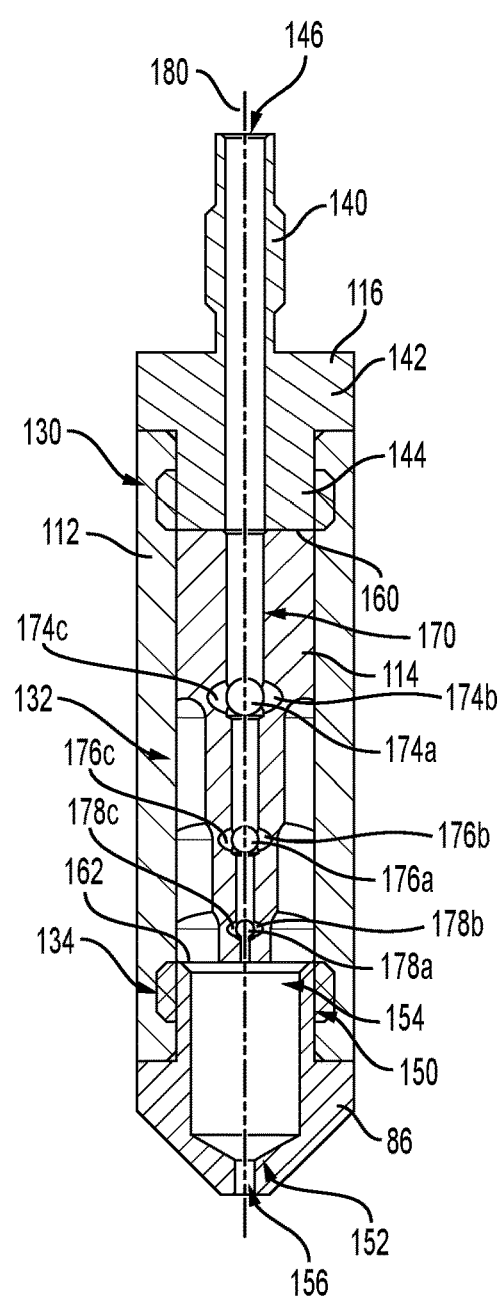
FIG. 5C is a cross-sectional view of the melt zone component and nozzle of FIG. 5A, taken along the line 5C-5C of FIG. 5A.

With reference to FIGS. 2 to 4, the extruder head assembly 56, which includes a carriage 80, a cold end component 82, a melt zone component 84 and a nozzle 86, will now be described in greater detail.

The carriage 80 moveably connects the extruder head assembly 56 to the moveable member 70. Indeed, the carriage 80, which is operatively connected to the controller 58, has actuators (not shown) enabling the carriage 80, and thus the extruder head assembly 56, to move along the moveable member 70 (i.e., between the side walls 64).

The cold end component 82, which is connected to the carriage 80, includes a housing 90 having a rear casing 92 and a front casing 94. It is contemplated that in some embodiments, the housing 90 could be a unitary housing. The rear casing 92 is connected to the carriage 80, and the front casing 94 is connected to the rear casing 92.

The cold end component 82 also includes a feeding tip 96 that is connected to the housing 90. In the illustrated embodiment, the feeding tip 96 is disposed at a top of the front casing 94. The feeding tip 96 is configured to connect to an end of the filament tube 74, and thus guides the filament into the housing 90. The cold end component 82 has a single feeding tip 92, the extruder head assembly 56 being configured to have a single input filament.

With reference to FIG. 4, disposed within the housing 90, the cold end component 82 includes filament advancing members 100 for driving the filament along the housing 90. In the illustrated embodiment, there are six filament advancing members 100: three filament advancing members 100*a*, and three filament advancing members 100*b* disposed opposite the members 100*a*. It is understood that the number of filament advancing members 100*a*, 100*b* could vary from one embodiment to another. The filament advancing members 100*a*, 100*b* are rotationally connected to the housing 90, and are operatively connected to a motor (not shown), which is operable by the controller 58. In the present embodiment, the filament advancing members 100*a*, 100*b* are wheels which are configured to frictionally engage with the filament. In other embodiments, the filament advancing members 100*a*. 100*b* could be gears or other engaging members. The filament advancing members 100*a* are spaced from the filament advancing members 100*b* so as to provide sufficient clearance for the filament to fit therebetween. As will be described below, the filament advancing members 100*a*. 100*b* are laterally moveable relative to one another.

Referring to FIGS. 3 and 4, the cold end component 82 also includes a knob 102 that is connected to the housing 90, and that is operatively connected to the filament advancing members 100*a*. 100*b*. As a result of the operative connection between the knob 102 and the filament advancing members 100, rotation of the knob 102 in one direction causes the filament advancing members 100*a*, 100*b* to move toward one another, and rotation of the knob 102 in the other direction causes the filament advancing members 100*a*, 100*b* to move away from one another. Rotating the knob 102, and thus moving the filament advancing members 100*a*, 100*b* toward or away from one another, can be done so that the filament advancing members 100*a*, 100*b* can adequately grip onto the filament, and/or so that the filament advancing members 100*a*. 100*b* can grip filament of various sizes.

The cold end component 82 also includes a fan 104 that is connected to the front casing 94. The fan 104 can provide ventilation, which can assist in maintaining the cold end component 82 at a lower temperature than the melt zone component 84.

Connected to the bottom of the housing 90 is the melt zone component 84, which includes a heat source 110, a holding member 112, an interior member 114, and a thermal block 116. The thermal block 116, the holding member 112 and the interior member 114 are at least partially received in the heat source 110, and the interior member 114 and the thermal block 116 are at least partially received in the holding member 112.

Figure 8:
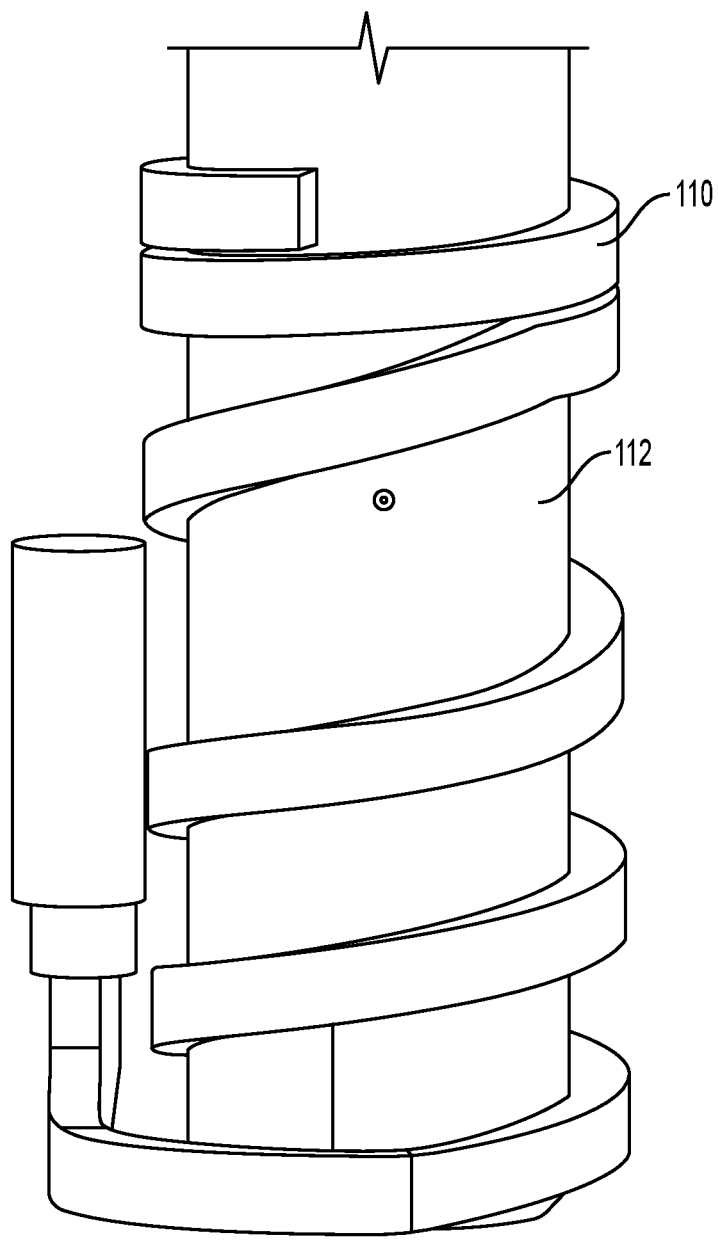
FIG. 8 is a perspective view of a melt zone component according to an alternative embodiment of the present technology.

In the present embodiment, the heat source 110 includes a heat transfer member 110 and a heater 120 that is received in the heat transfer member 110. Heat from the heater 120 is transferred generally uniformly to the holding member 112 by the heat transfer member 110. The heat source 110 is configured and arranged to minimize heat transfer to the housing 90, with aid from inter alia the thermal block 116. It is contemplated that the heat source 110 could vary from one embodiment to another. For example, in an alternative embodiment of the present technology shown in FIG. 8, the heat source 110 is a serpentine heater that surrounds the holding member 112. Returning to FIG. 4, the heat source 110 defines a receiving section 122 extending along an entire length thereof. The receiving section 122 is configured to receive the holding member 112, the interior member 114, and part of the thermal block 116. The heat source 110 is configured to heat the holding and interior members 112, 114 for heating the filament.

With reference to FIGS. 4, 5A, 5B and 5C, the holding member 112, received in the receiving section 122 of the heat source 110, is configured to hold the interior member 114, the thermal block 116 and the nozzle 86. The holding member 112 has an upper connection portion 130 and a lower connection portion 134, and defines a receiving section 132 therein. In the illustrated embodiment, the upper connection portion 130 is threaded, which enables the holding member 112 to connect with the thermal block 116. The receiving section 132 is sized to receive the interior member 114, and the lower connection portion 134 is threaded, which enables the holding member 112 to connect with the nozzle 86. It is contemplated that in some embodiments, the upper and lower connection portions 130, 134 could be differently arranged, i.e., not threaded. For example, in some embodiments, the connection between the upper connection 130 and the thermal block 116 could be provided by an interference fit.

The thermal block 116, disposed at a top of the melt zone component 84, has a tip portion 140, an intermediate portion 142 and a connection portion 144. The thermal block 116 defines a channel 146 that extends along an entire length of the thermal block 116 (i.e., through the tip, intermediate and connection portions 140, 142, 144). The tip portion 140 is partially received in the housing 90 such that filament advanced by the filament advancing members 100 is received into the channel 146. The intermediate portion 142 is radially larger than the tip portion and sized so as to fully enclose a top of the holding member 112. This can assist in reducing heat transfer from the melt zone component 84 to the cold end component 82. The connection portion 144 is complementary to the upper connection portion 130, such that, in the present embodiment, the connection portion 144 is threaded. The thermal block 116 can be made of a material having low thermal conductivity and high melting fusion point, such as, for instance, titanium or stainless steel.

The interior member 114 is received in the receiving section 132, below the thermal block 116, and will be described in greater detail below.

The nozzle 86 is connected to the holding member 112, below and downstream of the interior member 114. It is to be noted that when the heat block 116 and the nozzle 86 are connected to the holding member 112, the interior member 114 is kept from moving along a length of the holding member 112.

The nozzle 86 has a connection portion 150 and a tip portion 152. The connection portion 150 is complementary to the lower connection portion 134, in the present embodiment, the connection portion 150 being threaded. A receiving channel 154 is defined in the nozzle 86, and is configured to receive the filament that has been heated by the melt zone component 84, i.e., the nozzle 86 is fluidly connected to the interior member 114. Additionally, the tip portion 152 defines an output aperture 156 that is configured to output the heated filament. It is contemplated that the shape of the receiving channel 154 could vary from one embodiment to another. For example, in some instances, the receiving channel 154 could define a sharp conical shape for better guiding the heated filament exiting from the melt interior member 114 to the output aperture 156. The size and shape of the output aperture 156 could also vary in different embodiments.

Referring to FIGS. 5B, 5C, 6, 7A, 7B and 7C, the interior member 114 will now be described in greater detail. The interior member 114, which has a generally cylindrical form, has a top end 160 and a bottom end 162. When the interior member 114 is received in the receiving section 132 of the holding member 112, the top end 160 is proximate to the thermal block 116, and the bottom end 162 is proximate to the nozzle 86.

The interior member 114 defines a passage 170, three melt channels 172a, 172b, 172c, three upper apertures 174a, 174b, 174c, three intermediate apertures 176a, 176b, 176c, and three lower apertures 178a, 178b, 178c. As will be described below, the number of melt channels and/or the number of apertures could change from one embodiment to another without departing from the scope of the present technology.

Broadly, the passage 170 is fluidly connected to the melt channels 172a, 172b, 172c. More specifically, the passage 170 is fluidly connected to the melt channel 172a by the upper, intermediate and lower apertures 174a, 176a, 178a; the passage 170 is fluidly connected to the melt channel 172b by the upper, intermediate and lower apertures 174b, 176b. 178b; and the passage 170 is fluidly connected to the melt channel 172c by the upper, intermediate and lower apertures 174c, 176c, 178c. One will note that the melt channels 172a, 172b, 172c are also fluidly connected to one another via the apertures. As will be described in greater detail below, the connection configuration between the passage 170 and the melt channels 172a, 172b, 172c could vary from one embodiment to another.

The passage 170 is defined from the top end 160 to the bottom end 162 of the interior member 114. As will be described below, it is contemplated that in some embodiments, the passage 170 could be defined to extend along only a portion of the length of the interior member 114 (i.e., not from the top end 160 to the bottom end 162). The channel 170 defines a central channel axis 180, which, as shown in the accompanying Figures, extends along a length of the passage 170, and through a radial center thereof. The passage 170 has an entry section 182a, an upper section 182b, an intermediate section 182c, and a bottom section 182d.

The entry section 182a extends from the top end 160 to the upper apertures 174a, 174b, 174c, the upper section 182b extends from the upper apertures 174a, 174b, 174c to the intermediate apertures 176a, 176b, 176c, the intermediate section 182c extends from the intermediate apertures 176a, 176b, 176c to the lower apertures 178a, 178b, 178c, and the lower section 182d extends from the lower apertures 178a, 178b, 178c to the bottom end 162.

The entry section 182a defines an entry diameter $D_E$, the upper section 182b defines an upper diameter $D_U$, the intermediate section 182c defines an intermediate diameter $D_I$, and the lower section 182d defines a lower diameter $D_L$. In the illustrated embodiment, the diameter of the passage 170 decreases from the top end 160 to the bottom end 162. More specifically, the entry diameter $D_E$ is greater than the upper diameter $D_U$, the intermediate diameter $D_I$ and the lower diameter $D_L$. The upper diameter $D_U$ is also greater than the intermediate and lower diameters $D_I$, $D_L$, and the intermediate diameter $D_I$ is greater than the lower diameter $D_L$. It is contemplated that in some embodiments, the diameter of the passage 170 could be uniform along the length of thereof. In other embodiments, the diameter of the passage 170 could gradually change along the length of the interior member 114, such that the passage 170 could define a frustoconical shape, for example.

Figure 6:
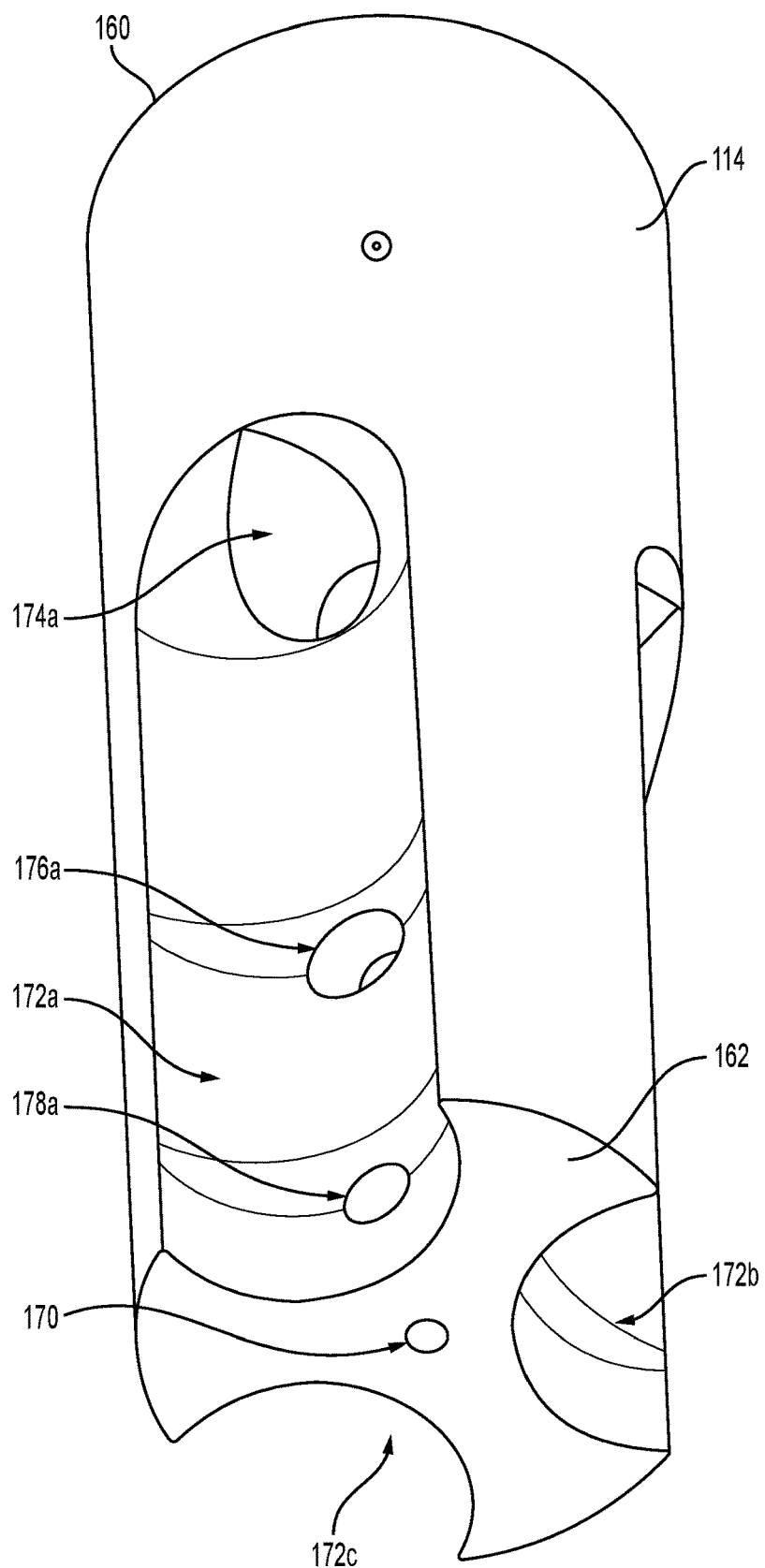
FIG. 6 is a perspective view taken from a bottom, rear, right side of an interior member of the melt zone component of FIG. 5A.
Figure 7A:
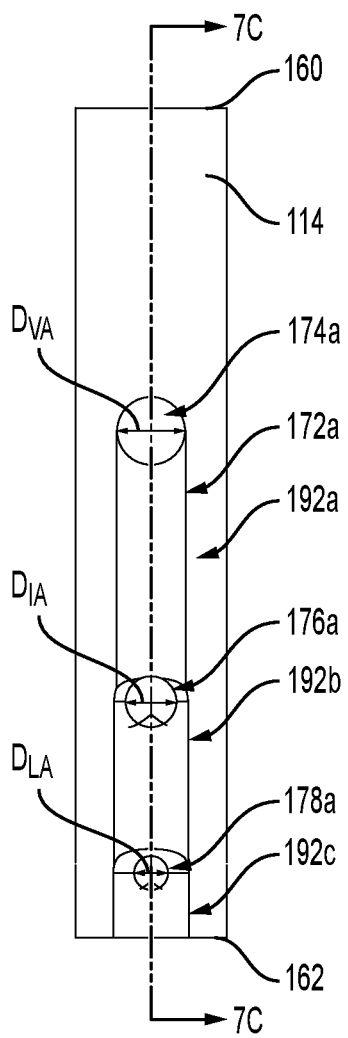
FIG. 7A is a side elevation view of the interior member of FIG. 6.
Figure 7C:
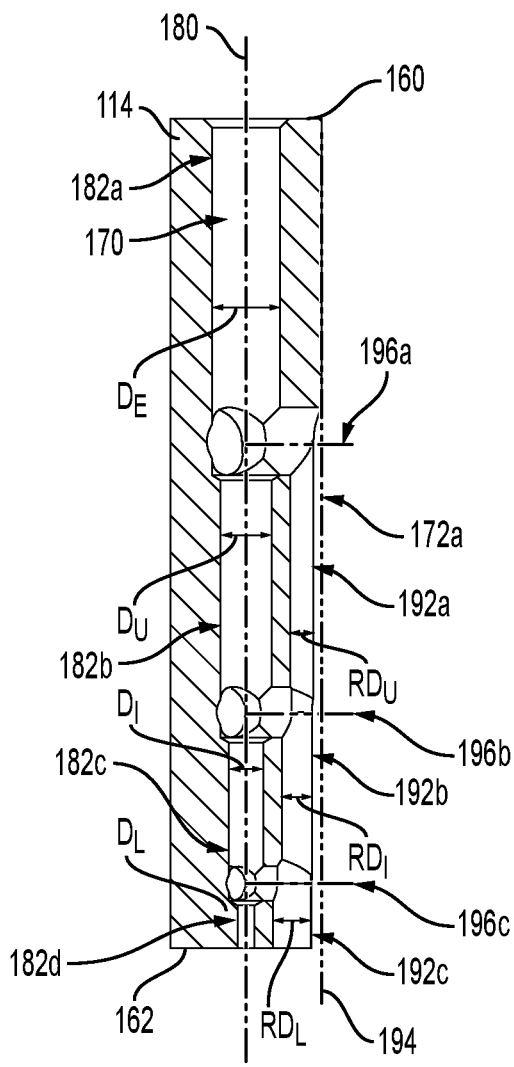
FIG. 7C is a cross-sectional of the interior member of FIG. 6, taken along line 7C-7C of FIG. 7A.
Figure 7B:
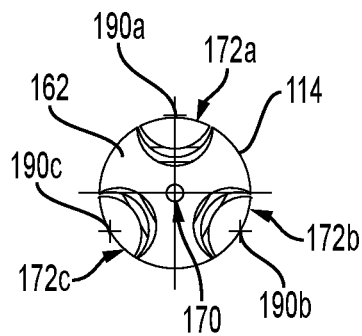
FIG. 7B is a bottom plan view of the interior member of FIG. 6.

As best seen in FIGS. 6 and 7B, the three melt channels 172a, 172b, 172c, are equally angularly spaced from one another. The melt channels 172a, 172b, 172c being angularly spaced from one another provide a symmetrical shape to the interior member 114, which can assist in uniformizing heat transfer within the interior member 114.

The melt channel 172a defines a melt channel axis 190a extending along a length of the melt channel 172a, the melt channel 172b defines a melt channel axis 190b extending along a length of the melt channel 172b, and the melt channel 172c defines a melt channel axis 190c extending along a length of the melt channel 172c. The melt channels 172a, 172b, 172c are oriented such that the central melt axes 190a, 190b, 190c are generally parallel to one another, and are generally parallel to the central passage axis 180. It is contemplated that in some embodiments, the melt channels 172a, 172b, 172c could be oriented such that the central melt axis 190a, 190b, 190c are skewed relative to the central passage axis 180.

Referring to FIGS. 7A and 7C, being that the melt channels 172a, 172b, 172c are similar, only the melt channel 172a will be described in detail herebelow.

The melt channel 172a is defined along part of the length of the interior member 114. While referred to as a "channel" herein, it is noted that the melt channel 172a is formed by an exterior form of the interior member 114, but forms a passage through the melt zone component 84 between the interior member 114 and the holding member 112. In the illustrated embodiment, the melt channel 172a is defined from the upper aperture 174a to the bottom end 162. It is contemplated that the melt channel 172a could be defined differently. For example, in some instance, the melt channel 172a could be defined from the upper aperture 174a to the lower aperture 178a. Additionally, the melt channel 172a has an arcuate cross-sectional form. It is contemplated that the form of the melt channel 172a could vary from one embodiment to another. For example, in some embodiments, the melt channel 172a could have a triangular or a rectangular cross-sectional shape. The melt channel 172a has an upper section 192a, an intermediate section 192b, and a lower section 192c.

The upper section 192a extends from the upper aperture 174a to the intermediate aperture 176a, the intermediate section 192b extends from the intermediate aperture 176a to the lower aperture 178a, and the lower section 192c extends from the lower aperture 178a to the bottom end 162 of the interior member 114.

The melt channel 172a is configured such that a size thereof increases along the length of the interior member 114. In the illustrated embodiment, the size of the melt channel 172a increases from one section to another. More specifically, in the illustrated embodiment, the upper section 192a has an upper radial depth $RD_U$ measured between an innermost radial point thereof and an outermost radial point thereof. The outermost radial point is coincident with a projection axis 194 (shown in dotted lines in FIG. 7C). The intermediate section 192b has an intermediate radial depth $RD_I$ measured between the innermost radial point thereof and the outermost radial point thereof (which is also coincident with the projection axis 194). The lower section 192c has a lower radial depth $RD_L$ measured between an innermost radial point thereof and the outermost radial point thereof (which is also coincident with the projection axis 194). The upper radial depth $RD_U$ is greater than the intermediate and lower radial depths $RD_I$, $RD_L$, and the intermediate radial depth $RD_I$ is greater than the lower radial $RD_L$. In other words, the depth of the melt channel 172a varies along the length of the melt channel 172a.

It is contemplated that in other embodiments, the size of the melt channel 172a could vary differently. For example, in some embodiments, the size of the upper, intermediate and lower sections 192a, 192b, 192c could vary in an angular fashion, with the upper section 192a having the smallest angular size, and the lower section 192c having the largest angular size.

Figure 9:
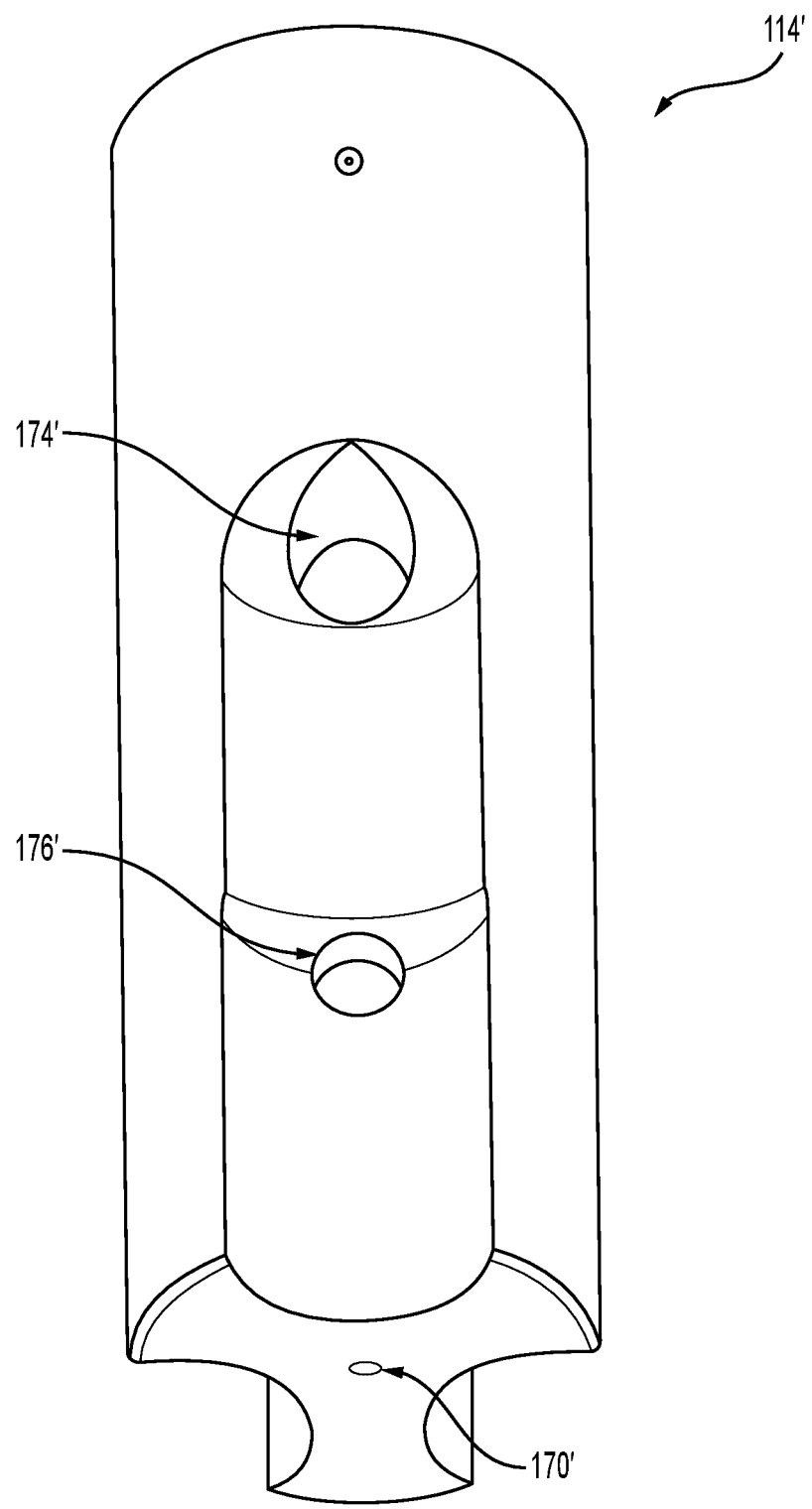
FIG. 9 is a bottom, side perspective view of an interior member according to an alternative embodiment of the present technology.

With continued reference to FIGS. 5C, 6, 7A and 7C, the melt channel 172a is fluidly connected to the passage 170 by the upper, intermediate and lower apertures 174a, 176a, 178a. It is to be noted that the other upper, intermediate and lower apertures 174b, 174c, 176b, 176c, 178b, 178c are similar to the upper, intermediate and lower apertures 174a, 176a, 178a. It is contemplated that the interior member 114 could define a different number of apertures. For example, referring to FIG. 9, which depicts an alternative embodiment of the interior member 114, namely interior member 114', the interior member 114' defines only two apertures 174', 176' per melt channel. In yet other embodiments, the interior member 114 could define a single aperture per melt channel. In some other embodiments, there could be a single aperture connecting two melt channels to the passage 170.

Returning to 5C, 6, 7A and 7C, the upper aperture 174a defines a central aperture axis 196a that is generally perpendicular to a plane containing the upper aperture 174a, the intermediate aperture 176a defines a central aperture axis 196b that is generally perpendicular to a plane containing the intermediate aperture 176a, and the lower aperture 178a defines a central aperture axis 196c that is generally perpendicular to a plane containing the lower aperture 178a. In the present embodiment, the respective planes of the upper, intermediate and lower apertures 174a, 176a, 178a are generally parallel to the central passage axis 180, such that the central aperture axes 196a, 196b, 196c are generally perpendicular to the central passage axis 180. As will be described in greater detail below, in other embodiments, one or more of the central aperture axes 196a, 196b, 196c could be skewed relative to the central passage axis 180.

The upper aperture 174a defines an upper aperture diameter $D_{UA}$, the intermediate aperture 176a defines an intermediate aperture diameter $D_{IA}$, and the lower aperture 178a defines a lower aperture diameter $D_{LA}$. The upper aperture diameter $D_{UA}$ is greater than the intermediate and lower aperture diameters $D_{IA}$, $D_{LA}$, and the intermediate aperture diameter $D_{IA}$ is greater than the lower aperture diameter $D_{LA}$.

With reference to FIG. 10A, 10B, 10C, another non-limiting embodiment of the interior member 114, namely interior member 114", is illustrated. Features of the interior member 114" similar to those of the interior member 114 have been labeled with the same reference numerals and will not be described in detail again.

The interior member 114" defines four melt channels 172a, 172b, 172c, 172d. The four melt channels 172a, 172b, 172c, 172d are equally angularly spaced. Additionally, the interior member 114" defines four upper apertures 174, four intermediate apertures 176 and four lower apertures 178.

The passage 170 of the interior member 114" is defined from the top end 160 of the interior member 114 to the lower apertures 178 and does not extend to a bottom end thereof. Thus, the passage 170 and the melt channels 172a, 172b, 172c, 172d merge upstream from the bottom end 162. In the present embodiment, the central aperture axes of the apertures 174, 176, 178 (only two apertures 178 being shown in FIG. 10C) are skewed relative to the central passage axis 180, as is illustrated by axes 196.

Referring back to FIGS. 3, 4, 5A to 5C, 6 and 7A to 7C, the operation of the extruder head assembly 56 will now be described.

To begin, the heater 120 of the heat source 110 is turned on. The heat source 110 heats the holding member 112, the interior member 114, and the nozzle 86 until a predetermined temperature is reached. In some instances, the pre-determined temperature is greater than the melting temperature of the filament. In other instances, the predetermined temperature could be below the melting temperature of the filament. As the effective melting temperature of different filaments could vary depending on base material, additives, etc., the pre-determined temperature may not in some cases be specifically tuned to the melting temperature of the filament used. It is to be noted that the thermal block 116, while also being heated by the heat source 110, assists in reducing heat transfer from the heat source 110, the holding member 112 and the interior member 114 to the cold end component 82 (in part due to its low thermal conductivity).

During operation, filament is provided to the extruder head assembly 56. Filament that is received into the cold end component 82 through the feeding tip 96 and is engaged between the advancing members 100a, 100b. Rotation of the advancing members 100a, 100b causes the filament to move along the housing 90 and eventually be received into the melt zone component 84. It is to be noted that during operation, the advancing members 100a, 100b are continuously rotated, and as such, filament is continuously fed into the melt zone component 84, barring any slippage or blocked of the filament.

The filament enters the melt zone component 84 by being received into the channel 146 of the thermal block 116 and entering into the entry section 182a of the passage 170.

Once the filament enters the passage 170, there is heat transfer from the interior member 114 to the filament and the filament begins to melt. However, it is to be noted that due to the heating configuration, the filament does not heat up and/or melt equally: a radially outer surface of the filament is at a higher temperature than a core of the filament. It is contemplated that in some embodiments, the filament could begin to melt in the thermal block 116.

Since the advancing members 100a, 100b are continuously rotating, the filament is continuously advancing. While advancing along the entry section 182a, part of the filament continues to melt. Eventually, the upper apertures 174a, 174b, 174c are reached. At this stage, some of the filament has turned into melted filament material. The melted filament material flows into the melt channels 172a, 172b, 172c through the upper apertures 174a, 174b, 174c. It is to be noted that in some embodiments where the upper apertures 174a, 174b, 174c are skewed, the melted filament material may be guided into the melt channels 172a, 172b, 172c more easily.

The unmelted filament flows past the upper apertures 174a, 174b, 174c and enters the upper section 182b. Since some of the filament has melted, the diameter of the unmelted filament entering the upper section 182b is less than the diameter of the filament entering the entry section 182a. As such, the upper diameter $D_U$ being smaller than the entry diameter $D_E$ can assist in minimizing clearance between the unmelted filament and the interior member 114, which can enhance heat transfer therebetween. Additionally, in some cases, the upper diameter $D_U$ has been reduced such that only the unmelted filament material can be received therein, thereby encouraging the melted filament material to flow into the melt channels 172a, 172b, 172c, 172d.

While advancing along the upper section 182b, the filament continues to melt. When arriving at the intermediate apertures 176a, 176b, 176c, more of the filament has melted. The melted filament material flows into the melt channels 172a, 172b, 172c through the intermediate apertures 176a, 176b, 176c.

As described above, the unmelted filament flows past the intermediate apertures 176a, 176b, 176c, and enters the intermediate section 182c. Since some of the filament has further melted, the diameter of the unmelted filament entering the intermediate section 182c is less than the diameter of the filament entering the upper section 182c. Thus, as described above, reduction of the intermediate diameter $D_I$, can assist in heat transfer.

Similar to the above, the filament continues to flow in the passage 170 until the bottom end 162 is reached. At the bottom end 162, a core of the filament is meant to have reached the desired temperature and melted as well.

As the filament is flowing in the passage 170 toward the lower end 162, the melted filament material is also flowing in the melt channels 172a, 172b, 172c toward the lower end 162. It is to be noted that the melted filament material can, in some instances, engage an inner surface of the holding member 112 while moving toward the lower end 162. Additionally, a temperature and/or the melted state of the melted filament material should generally be maintained, as the melted filament material is also subject to heat transfer from the holding and interior members 112, 114.

Finally, the output from the passage 170 and the melt channels 172a, 172b, 172c merge into the nozzle 86, before being extruded through the output aperture 156. Upon combination in the nozzle 86, all extruded filament material is meant to have melted and be at a desired temperature. In at least some embodiments, recombination of the passage 170 and the melt channels 172a, 172b, 172c could take place in a lower portion of the interior member 114, prior to arrival at the nozzle 86.

Modifications and improvements to the above-described embodiments of the present invention may become apparent to those skilled in the art. The foregoing description is intended to be exemplary rather than limiting. The scope of the present invention is therefore intended to be limited solely by the appended claims.

What is claimed is:

1. An extruder head assembly for an additive manufacturing machine, the extruder head assembly comprising:
   a melt zone component operatively connected to a cold end component for receiving and heating a filament advanced by the cold end component; and
   a nozzle operatively connected to the melt zone component, the nozzle being configured to receive the filament having been heated from the melt zone component,
   the melt zone component comprising:
      a heat source, and
      an interior member in thermal communication with the heat source, the interior member defining therein:
         a passage configured to heat unmelted material of the filament,
         at least one melt channel, and
         at least one aperture fluidly connecting the passage to the at least one melt channel, the at least one aperture being configured to direct melted filament material toward the at least one melt channel,
      the passage and the at least one melt channel fluidly connecting downstream from the at least one aperture,
      the nozzle being configured to receive heated filament material from the passage and the at least one melt channel.

2. The extruder head assembly of claim 1, wherein:
   the at least one aperture defines a central aperture axis that is generally perpendicular to a plane containing the at least one aperture,
   the passage defines a central passage axis extending along a length passage, and
   the central aperture axis is one of:
      generally perpendicular to the central passage axis; and
      generally skewed relative to the central passage axis.

3. The extruder head assembly of claim 2, wherein:
   the at least one melt channel defines a central melt axis extending along the length of the at least one melt channel; and
   the central melt axis is parallel to the central passage axis.

4. The extruder head assembly of claim 1, wherein:
   the passage defines a central passage axis extending along a length of the passage;
   the at least one melt channel defines a melt channel axis extending along a length of the at least one melt channel; and
   the melt channel axis is parallel to the central passage axis.

5. The extruder head assembly of claim 1, wherein the passage has:
   a first passage diameter upstream from the at least one aperture;
   a second passage diameter downstream from the at least one aperture; and
   the first passage diameter is greater than the second passage diameter.

6. The extruder head assembly of claim 1, wherein the at least one aperture includes a first aperture and a second aperture, the second aperture being spaced from the first aperture along a length of the interior member.

7. The extruder head assembly of claim 6, wherein the first aperture has a first aperture diameter, the second aperture has a second aperture diameter, and the first aperture diameter is greater than the second aperture diameter.

8. The extruder head assembly of claim 6, wherein the passage has:
   a first passage diameter upstream from the first aperture;
   a second passage diameter downstream from the first aperture and upstream from the second aperture; and
   a third passage diameter downstream from the second aperture, and
   the first passage diameter is greater than the second and third passage diameters, and the second passage diameter is greater than the third passage diameter.

9. The extruder head assembly of claim 1, wherein the at least one melt channel includes a first melt channel and a second melt channel.

10. The extruder head assembly of claim 9, wherein the at least one aperture fluidly connects the passage to the first and second melt channels.

11. The extruder head assembly of claim 9, wherein the at least one aperture includes a first aperture fluidly connecting the passage to the first melt channel, and a second aperture fluidly connecting the passage to the second melt channel.

12. The extruder head assembly of claim 1, wherein:
   the at least one melt channel includes a first melt channel, a second melt channel and a third melt channel; and
   the at least one aperture includes:
      a first aperture fluidly connecting the passage to the first melt channel,
      a second aperture fluidly connecting the passage to the second melt channel, and
      a third aperture fluidly connecting the passage to the third melt channel.

13. The extruder head assembly of claim 12, further including a fourth aperture fluidly connecting the passage to the first melt channel, the fourth aperture being spaced from the first aperture along a length of the interior member.

14. The extruder head assembly of claim 13, wherein the first aperture has a first aperture diameter, the fourth aperture has a second aperture diameter, and the first aperture diameter is greater than the second aperture diameter.

15. The extruder head assembly of claim 13, wherein the passage has:
   a first passage diameter upstream from the first aperture;
   a second passage diameter downstream from the first aperture and upstream from the fourth aperture; and
   a third passage diameter downstream from the fourth aperture, and
   the first passage diameter is greater than the second and third passage diameters, and the second passage diameter is greater than the third passage diameter.

16. The extruder head assembly of claim 1, wherein the melt zone component further includes a holding member selectively receiving the interior member therein, one end of the holding member being selectively connected to the cold end component, and another end of the holding member being selectively connected to the nozzle.

17. The extruder head assembly of claim 1, further comprising the cold end component for receiving filament, the cold end component including filament advancing members.

* * * * *